United States Patent
Kawakatsu et al.

(10) Patent No.: US 6,682,434 B2
(45) Date of Patent: Jan. 27, 2004

(54) CONSTANT VELOCITY UNIVERSAL JOINT

(75) Inventors: Tsutomu Kawakatsu, Mooka (JP); Satoru Kudo, Utsunomiya (JP); Shouichi Nakao, Mooka (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/034,376

(22) Filed: Jan. 3, 2002

(65) Prior Publication Data

US 2002/0128078 A1 Sep. 12, 2002

(30) Foreign Application Priority Data

Jan. 19, 2001 (JP) .......................................... 2001-012141

(51) Int. Cl.$^7$ ............................................... F16D 3/205
(52) U.S. Cl. ....................................... 464/111; 464/123
(58) Field of Search ................................. 464/111, 123, 464/124, 905; 384/282, 295

(56) References Cited

U.S. PATENT DOCUMENTS

| | | | | | |
|---|---|---|---|---|---|
| 4,854,917 | A | * | 8/1989 | Mizukoshi | 464/111 |
| 5,019,016 | A | * | 5/1991 | Uchman | 464/111 |
| 5,098,342 | A | * | 3/1992 | Mizukoshi | 464/111 |
| 5,507,693 | A | * | 4/1996 | Schwarzler et al. | 464/111 |
| 5,935,009 | A | | 8/1999 | Hozdez et al. | |

FOREIGN PATENT DOCUMENTS

| DE | 198 34 142 A1 | 2/2000 |
|---|---|---|
| FR | 2 752 890 | 8/1996 |

* cited by examiner

Primary Examiner—Greg Binda
(74) Attorney, Agent, or Firm—Birch, Stewart, Kolasch & Birch, LLP (57) ABSTRACT

A constant velocity universal joint includes an inner roller and a trunnion. The inner roller has a chamfered portion formed by an inclined surface inclined at an angle not less than an assembling angle θ. The inclined surface extends from a starting point defined by a crossing point of a spherical recess of the inner roller and a short radius r of an elliptic cutout formed on the inner roller.

9 Claims, 12 Drawing Sheets

FIG. 5 (COMPARATIVE EXAMPLE)

FIG. 6
(COMPARATIVE EXAMPLE)

FIG. 7
(COMPARATIVE EXAMPLE)

FIG. 8

(COMPARATIVE EXAMPLE AND PRESENT EMBODIMENT)

FIG. 9
(COMPARATIVE EXAMPLE)

FIG. 10
(PRESENT EMBODIMENT)

FIG. 11
(PRESENT EMBODIMENT)

CONSTANT VELOCITY UNIVERSAL JOINT

BACKGROUND OF THE INVENTION

1. Field of the Invention

The present invention relates to a constant velocity universal joint for connecting a first shaft as one transmission shaft and a second shaft as the other transmission shaft, for example, in a driving force-transmitting section of an automobile.

2. Description of the Related Art

Constant velocity universal joints are commonly used in motor vehicle applications. The constant velocity universal joint is disposed in a driving force-transmitting section of an automobile for connecting a first shaft as one transmission shaft and a second shaft as the other transmission shaft so that a rotary force is transmitted to respective axles.

The present applicant has proposed a constant velocity universal joint and an assembling method thereof in U.S. Pat. Nos. 6,454,655 and 6,497,621. According to the constant velocity universal joint, induced thrust performance and durability are improved by reducing slide resistance generated when one transmission shaft is tilted and a trunnion is displaced along a guide track. The present invention has been made in relation to this proposal.

SUMMARY OF THE INVENTION

A general object of the present invention is to provide a constant velocity universal joint by implementing the assembling method according to the above proposal. According to the present invention, without decreasing the assembling performance, the diameter of a neck of a trunnion is increased so that strength of the trunnion is increased.

A principal object of the present invention is to provide a constant velocity universal joint by implementing the assembling method according to the above proposal. According to the present invention, without decreasing the assembling performance, the diameter of a neck of a trunnion is increased so that productivity in forging the trunnion is improved.

The above and other objects, features, and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
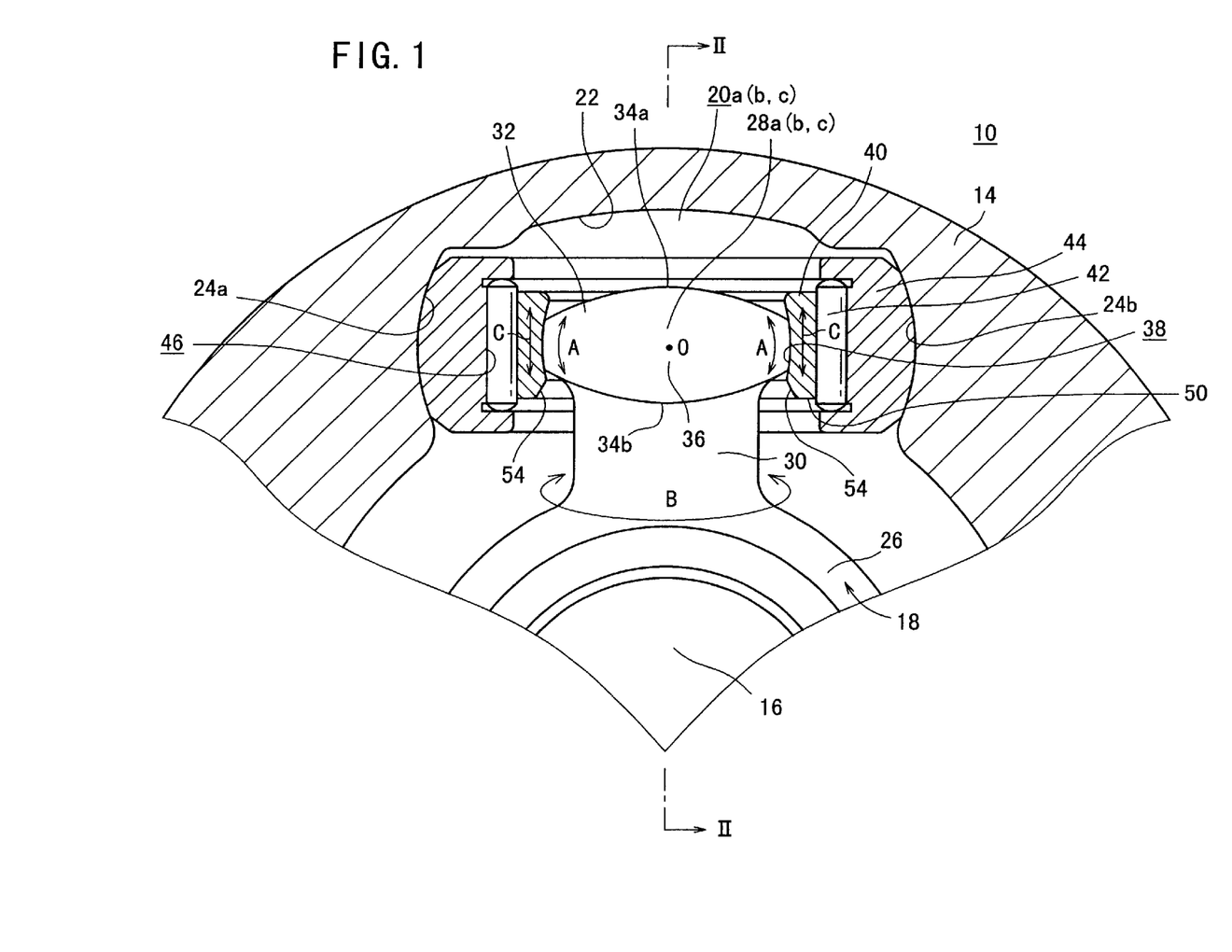
FIG. 1 is a vertical sectional view with partial omission showing a constant velocity universal joint, in a direction substantially perpendicular to an axis of the constant velocity universal joint, according to an embodiment of the present invention.
Figure 2:
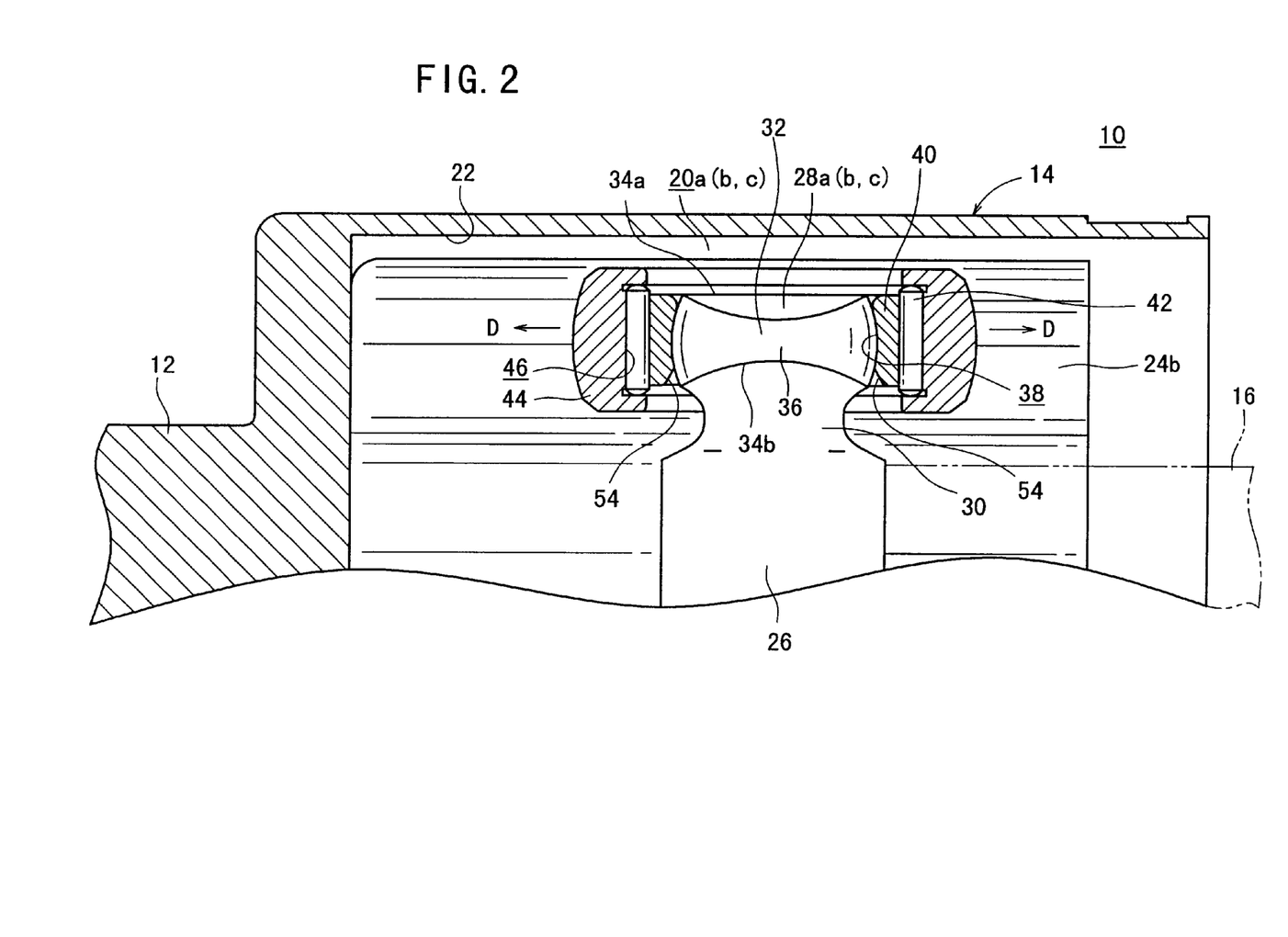
FIG. 2 is a vertical sectional view showing the constant velocity universal joint taken along a line II—II shown in FIG. 1.

With reference to FIGS. 1 and 2, reference numeral 10 indicates a constant velocity universal joint according to an embodiment of the present invention.

The constant velocity universal joint 10 comprises a cylindrical outer cup (outer member) 14 which has an opening and which is integrally connected to one end of a first shaft 12 as one transmission shaft, and an inner member 18 which is secured to one end of a second shaft 16 as the other transmission shaft and which is accommodated in the opening of the outer cup 14.

As shown in FIG. 1, three guide grooves 20a to 20c (guide grooves 20b, 20c are not shown), which extend in the axial direction and which are spaced apart by about 120 degrees respectively about the axial center, are formed on the inner wall surface of the outer cup 14. Each of the guide grooves 20a to 20c includes a ceiling section 22, and side surface sections 24a, 24b formed on opposite sides of the ceiling section 22. The ceiling section 22 has a recess curved along the outer circumferential surface of the outer cup 14. Each of the side surface sections 24a, 24b has an arc-shaped curved surface in cross section.

Figure 3:
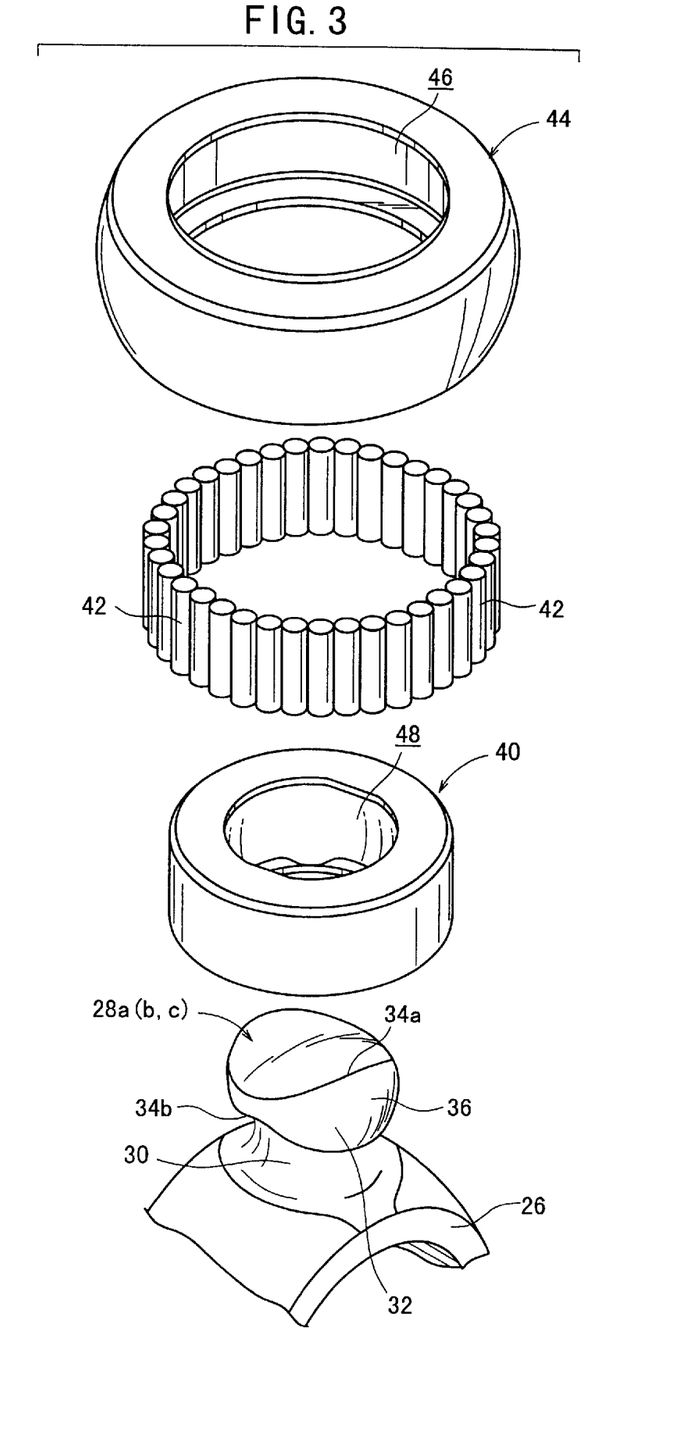
FIG. 3 is an exploded vertical sectional view with partial omission showing an inner member of the constant velocity universal joint shown in FIG. 1.

A ring-shaped spider boss section 26 is externally fitted to the second shaft 16. Three trunnions 28a to 28c (trunnions 28b, 28c are not shown), which are expanded toward the guide grooves 20a to 20c respectively and which are spaced apart by about 120 degrees about the axial center, are integrally formed on the outer circumferential surface of the spider boss section 26. As shown in FIGS. 1 to 3, each of the trunnions 28a to 28c comprises a neck 30 which is expanded radially outwardly from the ring-shaped spider boss section 26, and a head 32 which is formed integrally with the neck 30.

A first curved surface 34a, which has an arc-shape with a predetermined curvature as viewed in the axial direction of the outer cup 14 (see FIG. 1) and which is formed linearly as viewed in the direction substantially perpendicular to the axis of the outer cup 14 (see FIG. 2), is provided on the upper surface of the head 32. The shape of the first curved surface 34a is not limited to the linear configuration as viewed in the direction substantially perpendicular to the axis of the outer cup 14. The first curved surface 34a may have an arc shape having a predetermined curvature as viewed in the direction substantially perpendicular to the axis of the outer cup 14.

A second curved surface 34b, which is similar to the first curved surface 34a described above, is formed on the lower surface of the head 32. The second curved surface 34b is continued to the neck 30. The head 32 further has a spherical surface 36 on the outer circumferential surface between the first curved surface 34a and the second curved surface 34b. An unillustrated chamfered section having a curved cross section may be provided at a boundary portion between the first curved surface 34a and the spherical surface 36 and at a boundary portion between the second curved surface 34b and the spherical surface 36.

As shown in FIG. 1, an inner roller (annular member) 40 and an outer roller 44 are disposed between the trunnion 28a to 28c and the side surface sections 24a, 24b. The inner roller 40 is a ring member having a spherical recess 38 corresponding to the spherical surface 36 of the trunnion 28a to 28c over the entire inner circumferential surface. The outer roller 44 is externally fitted to the inner roller 40 with a plurality of needle bearings 42 interposed therebetween.

The outer circumferential surface of the outer roller 44 has an arc-shaped cross section corresponding to the side surface sections 24a, 24b of the guide groove 20a to 20c. The outer circumferential surface of the outer roller 44 and the side surface sections 24a, 24b of the guide groove 20a to 20c make surface-to-surface contact with each other.

The cross-sectional configurations of the outer circumferential surface of the outer roller 44 and the side surface sections 24a, 24b of the guide groove 20a to 20c are not limited to the arc-shaped configurations respectively.

Each of the outer circumferential surface of the outer roller 44 and the side surface sections 24a, 24b of the guide groove 20a to 20c may have a linear cross section.

The plurality of needle bearings 42 are rollably installed into an inner annular recess 46 of the outer roller 44. The plurality of needle bearings 42 may be installed using the keystone effect so that they are not disengaged from the recess 46.

Figure 4:
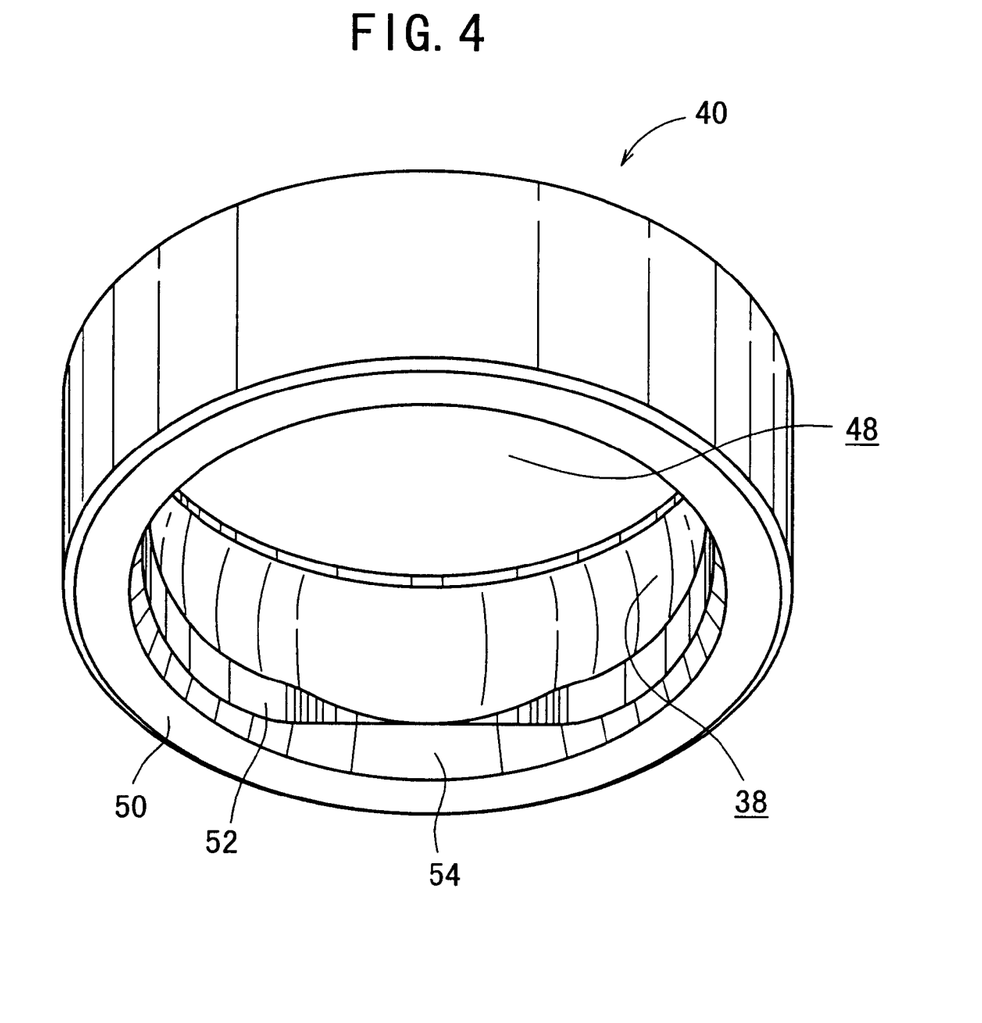
FIG. 4 is a perspective view showing an inner roller of the inner member.

As shown in FIG. 4, the inner roller 40 has a substantially elliptic cutout 52 at the boundary between an upper surface section 50 and an inner wall of the hole 48, so that the trunnion 28a (28b, 28c) can be assembled easily into the hole 48 of the inner roller 40. Further, a chamfered portion 54 is formed at the boundary between the upper surface section 50 and the inner surface of the hole 48 of the inner roller 40. The chamfered portion 54 extends circumferentially along the cutout 52.

The chamfered portion 54 is inclined at an angle not less than an assembling angle θ as described later on. The chamfered portion 54 is formed by an inclined surface inclined at a predetermined angle (α°) with respect to an extension line 58 from a short radius (r) of the elliptic cutout 52 formed on the inner roller 40 (see FIG. 11).

As shown in FIG. 1, the spherical surface 36 of the trunnion 28a to 28c and the recess 38 of the inner roller 40 make surface-to-surface contact with each other. Therefore, the trunnion 28a to 28c is rotatable in the direction of the arrow A about the point O with respect to the inner roller 40. Further, the trunnion 28a to 28c is rotatable in the circumferential direction (direction of the arrow B) along the spherical surface about the axis of the trunnion 28a to 28c. The trunnion 28a to 28c and the inner roller 40 are displaceable in the vertical direction (direction of the arrow C) together with the needle bearings 42 supported by the outer roller 44.

The constant velocity universal joint 10 according to the embodiment of the present invention is basically constructed as described above. Next, its operation, function, and effect will be explained.

When the first shaft 12 as a transmission shaft is rotated, a rotary force is transmitted to the inner member 18 via the outer cup 14. The second shaft 16 is rotated in a predetermined direction by the aid of the trunnions 28a to 28c.

That is, the rotary force of the outer cup 14 is transmitted to the inner rollers 40 via the needle bearings 42 and the outer rollers 44 which make contact with the guide grooves 20a to 20c. Further, the rotary force is transmitted to the trunnions 28a to 28c via the spherical surfaces 36 which make surface-to-surface contact with the recesses 38 of the inner rollers 40. Accordingly, the second shaft 16, which is engaged with the trunnions 28a to 28c, is rotated.

In this arrangement, when the second shaft 16 is inclined by a predetermined angle with respect to the outer cup 14 having the first shaft 12, then the trunnions 28a to 28c make sliding displacement in the direction of the arrow A about the points O as shown in FIG. 1, or the trunnions 28a to 28c make sliding displacement in the circumferential direction (direction of the arrow B) along the spherical recesses 38 about the axes of the trunnions 28a to 28c. At this time, the spherical surfaces 36 of the trunnions 28a to 28c remain in surface-to-surface contact with the spherical recesses 38 of the inner rollers 40.

The trunnions 28a to 28c are displaceable in the axial directions (direction of the arrow C) of the trunnions 28a to 28c together with the inner rollers 40 which make sliding movement with respect to the needle bearings 42 supported by the outer rollers 44.

The trunnions 28a to 28c are displaceable in the directions substantially perpendicular to the axes of the trunnions 28a to 28c, i.e., in the longitudinal directions (direction of the arrow D) of the guide grooves 20a to 20c (see FIG. 2) by the aid of the outer rollers 44 which make sliding movement along the guide grooves 20a to 20c.

As described above, the rotary motion of the first shaft 12 is smoothly transmitted to the second shaft 16 regardless of the angle of inclination of the second shaft 16 with respect to the outer cup 14.

According to the present embodiment, each of the trunnion 28a to 28c has the spherical surface 36. The trunnions 28a to 28c slide along the spherical recesses 38 of the inner rollers 40 corresponding to the spherical surfaces 36. Further, the trunnions 28a to 28c are displaceable in the axial directions of the trunnions 28a to 28c together with the inner rollers 40. Therefore, it is possible to reduce sliding resistance and induced thrust force. Further, the trunnions 28a to 28c and the inner rollers 40 make surface-to-surface contact with each other. Therefore, a load applied to the contacting portions by contact pressure is reduced. Therefore, durability of the constant universal joint 10 is improved.

The induced thrust force is a load of frictional force generated when the trunnions 28a to 28c are displaced along the guide grooves 28a to 28c.

Enhancement in the strength of necks 30 of the trunnions 28a to 28c will be described below.

Figure 5:
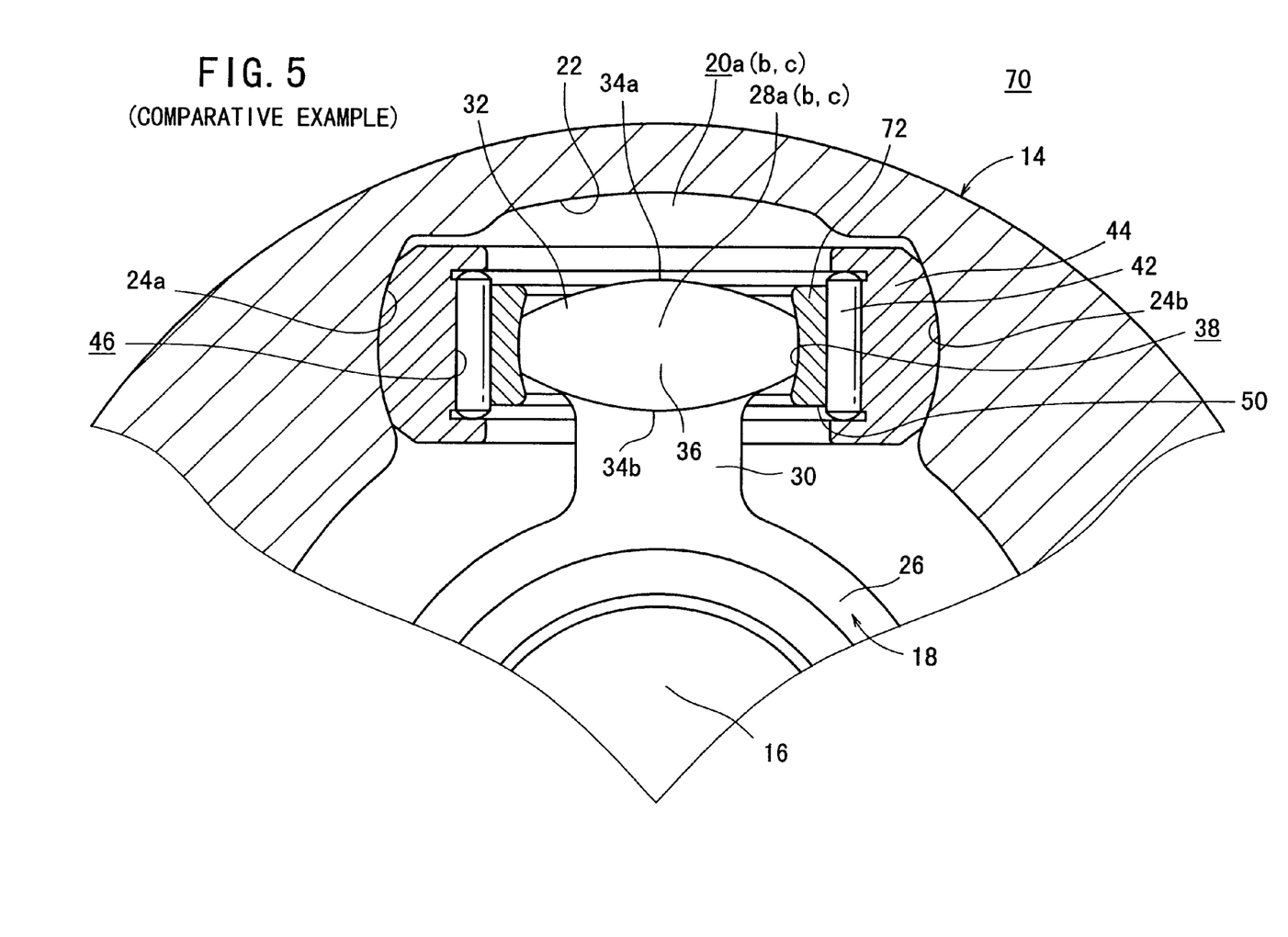
FIG. 5 is a vertical sectional view with partial omission showing a constant velocity universal joint according to a comparative example.

FIG. 5 shows a constant velocity universal joint 70 according to a comparative example. The constant velocity universal joint 70 does not have a chamfered portion 54 in the inner circumferential surface defining a hole 48 of an inner roller 72 (see FIG. 6) unlike the constant velocity universal joint 10 according to the present embodiment.

However, the constant velocity universal joint 70 is constructed basically similar to the constant velocity universal joint 10. The constituent elements of the constant velocity universal joint 70 that are identical to those of the constant velocity universal joint 10 are labeled with the same reference numeral, and detailed description thereof is omitted.

Figure 7:
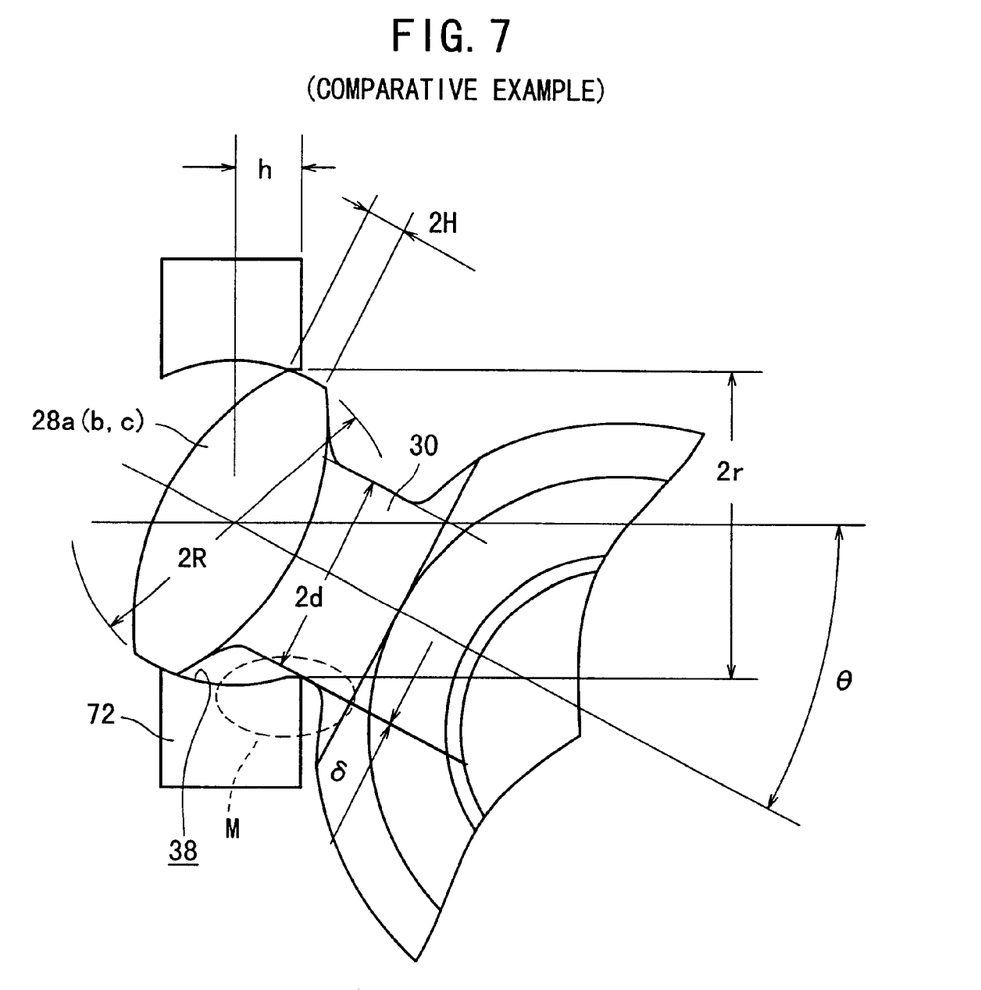
FIG. 7 illustrates dimensional conditions for installing the inner roller to a trunnion in the constant velocity universal unit according to the comparative example.

As shown in FIG. 7, according to the constant velocity universal joint 70 of the comparative example, the trunnion 28a (28b, 28b) is inclined by an angle θ with respect to the inner roller 72 having the substantially elliptic cutout 52, and the trunnion 28a (28b, 28c) is inserted into the hole 48 along the substantially elliptic cutout 52. Accordingly, the inner roller 72 is installed to the trunnion 28a (28b, 28c).

Figure 8:
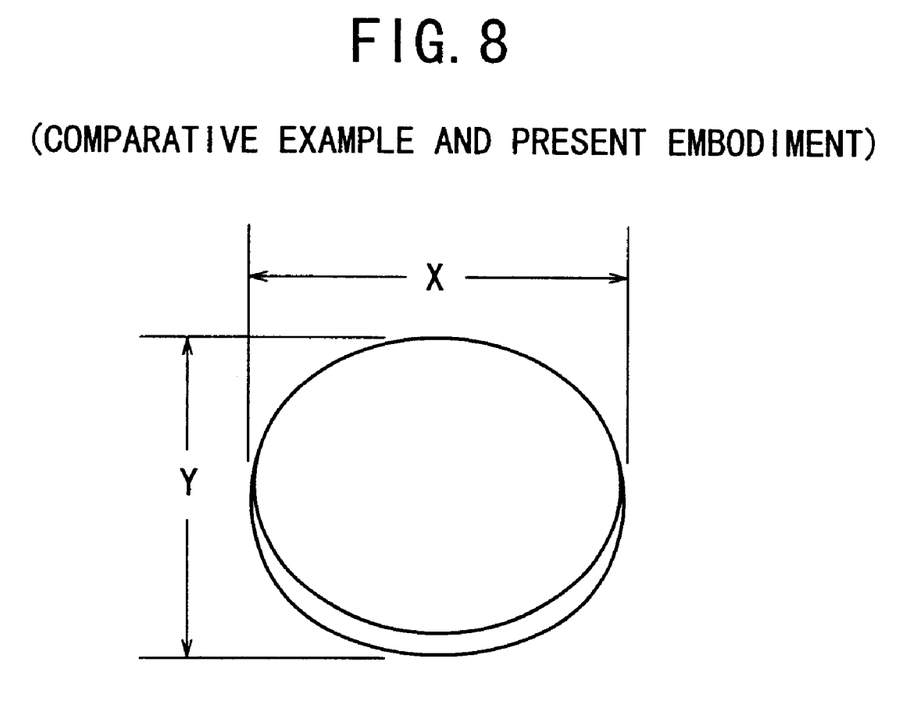
FIG. 8 illustrates dimensional conditions for installing the inner roller to the trunnion in the constant velocity universal unit according to the present embodiment and the comparative example.

In FIG. 7, θ represents the assembling angle, R represents the radius of the spherical surface 36 of the trunnion 28a (28b, 28c), H represents the half spherical surface width of the trunnion 28a (28b, 28c), i.e., 2H represents the full spherical surface width of the trunion 28a (28b, 28c), r represents the short radius of the elliptic cutout 52 formed on the inner roller 72, h represents the half width of the inner roller 72, d represents the radius of the neck 30 of the trunnion 28a (28b, 28c), X represents the projection long width of the spherical surface 36 of the trunnion 28a (28b, 28c) when the assembling angle is inclined by θ (see FIG. 8), Y represents the projection short width of the spherical surface 36 of the trunnion 28a (28b, 28c) when the assembling angle is inclined by θ (see FIG. 8), and δ represents the clearance (distance) between a circumferential edge of the hole 48 of the inner roller 72 and the neck 30 of the trunnion 28a (28b, 28c).

In this arrangement, the condition, under which the projection short width Y of the spherical surface 36 of the trunnion 28a (28b, 28c) is smaller than 2R (diameter of the spherical surface 36), i.e., the spherical surface 36 reliably falls within the half width h of the inner roller 72, is represented by the following expression (I).

$$R - r > 0 \tag{I}$$

The condition, under which Y<X is satisfied, is represented by the following expression (II).

$$\theta - \sin^{-1} \frac{H}{R} > 0 \tag{II}$$

The condition, under which the trunnion 28a (28b, 28c) and the inner roller 72 make no interference, is represented by the following expression (III).

$$\sqrt{r^2 + h^2} \cdot \sin\left(\tan^{-1} \frac{h}{r} - \theta\right) - d > 0 \tag{III}$$

In the constant velocity universal joint 70 according to the comparative example, it is appreciated from the above expression (III) that the diameter (2d) of the neck 30 of the trunnion 28a (28b, 28c) can be increased by decreasing the half width h of the inner roller 70 or increasing the short radius r of the elliptic cutout 52 formed on the inner roller 72.

However, if the half width h of the inner roller 72 is decreased, the surface area of the needle rolling surface (outer circumferential surface) of the inner roller 72 is decreased. If the short radius r of the elliptic cutout 52 formed on the inner roller 72 is increased, the contact area of the spherical surface 36 contacting with the inner roller 72 is decreased.

The constant velocity universal joint 10 according to the embodiment of the present invention solves the above problems, and the diameter of the neck 30 of the trunnion 28a (28b, 28c) is increased.

Figure 10:
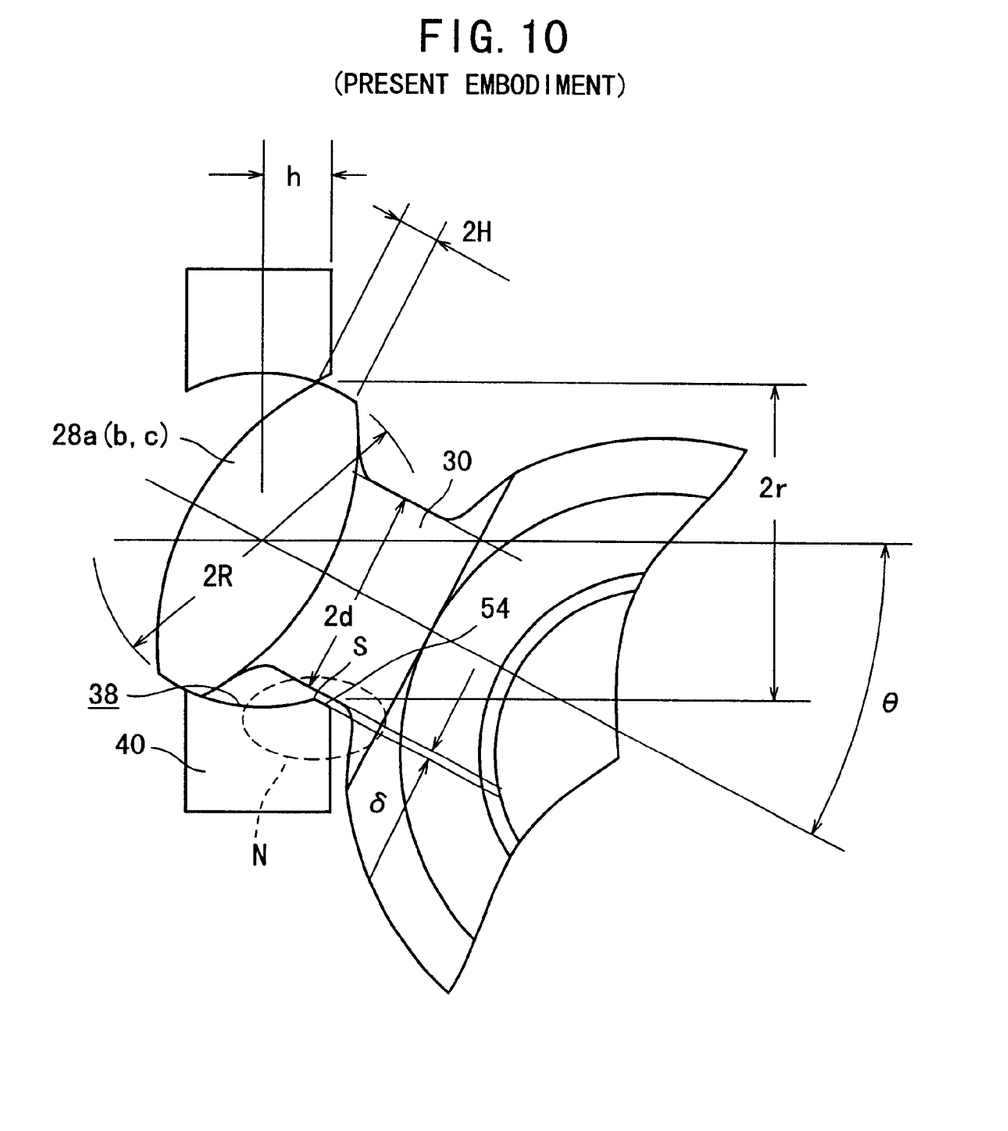
FIG. 10 illustrates dimensional conditions for installing the inner roller to the trunnion in the constant velocity universal unit according to the present embodiment.

In the constant velocity universal joint 10 of the present embodiment, as with the comparative example, the trunnion 28a (28b, 28b) is inclined by an angle θ with respect to the inner roller 40 having the substantially elliptic cutout 52, and the trunnion 28a (28b, 28c) is inserted into the inner roller 40 along the substantially elliptic cutout 52. Accordingly, the inner roller 40 is installed to the trunnion 28a (28b, 28c).

In FIG. 10, θ represents the assembling angle, R represents the radius of the spherical surface 36 of the trunnion 28a (28b, 28c), H represents the half spherical surface width of the trunnion 28a (28b, 28c), i.e., 2H represents the full spherical surface width of the trunion 28a (28b, 28c), r represents the short radius of the elliptic cutout 52 formed on the inner roller 40, h represents the half width of the inner roller 40, d represents the radius of the neck 30 of the trunnion 28a (28b, 28c), X represents the projection long width of the spherical surface 36 of the trunnion 28a (28b, 28c) when the assembling angle is inclined by θ (see FIG. 8), Y represents the projection short width of the spherical surface 36 of the trunnion 28a (28b, 28c) when the assembling angle is inclined by θ (see FIG. 8), and δ represents the clearance (distance) between a circumferential edge of the hole 48 of the inner roller 40 and the neck 30 of the trunnion 28a (28b, 28c). The clearance δ indicates a margin for preventing interference between the inclined surface of the chamfered portion 54 of the inner roller 40 and the neck 30 of the trunnion 28a (28b, 28c).

The condition, under which the projection short width Y of the spherical surface 36 of the trunnion 28a (28b, 28c) is smaller than 2R (diameter of the spherical surface 36), i.e., the spherical surface 36 reliably falls within the half width h of the inner roller 40, is represented by the following expression (1).

$$R - r > 0 \tag{1}$$

The condition, under which Y<X is satisfied, is represented by the following expression (2).

$$\theta - \sin^{-1} \frac{H}{R} > 0 \tag{2}$$

The condition, under which the trunnion 28a (28b, 28c) and the inner roller 40 make no interference, is represented by the following expression (3).

$$R \cdot \sin\left(\sin^{-1} \frac{r}{R} - \theta\right) - d > 0 \tag{3}$$

The condition, under which the assembling operation is performed without forcibly inserting the trunnion 28a (28b, 28c) into the inner roller 40, is represented by the following expression (4). The condition, under which the assembling operation is performed by forcibly inserting the trunnion 28a (28b, 28c) into the inner roller 40, is represented by the following expression (5).

$$r - H \sin \theta + \sqrt{R^2 - H^2} \cdot \cos \theta > 0 \tag{4}$$

$$r - H \sin \theta + \sqrt{R^2 - H^2} \cdot \cos \theta \leq 0 \tag{5}$$

The shapes of the trunnion 28a (28b, 28c) and the cutout 52 of the inner roller 40 are designed so that the expressions (1) to (5) are satisfied. Accordingly, it is possible to increase the strength of the neck 30 of the trunnion 28a (28b, 28c). One of the expressions (4) and (5) is selected depending of the assembling condition under which the assembling operation is performed by forcibly inserting the trunnion 28a (28b, 28c) into the inner roller 40 or without forcibly inserting the trunnion 28a (28b, 28c) into the inner roller 40.

Figure 9:
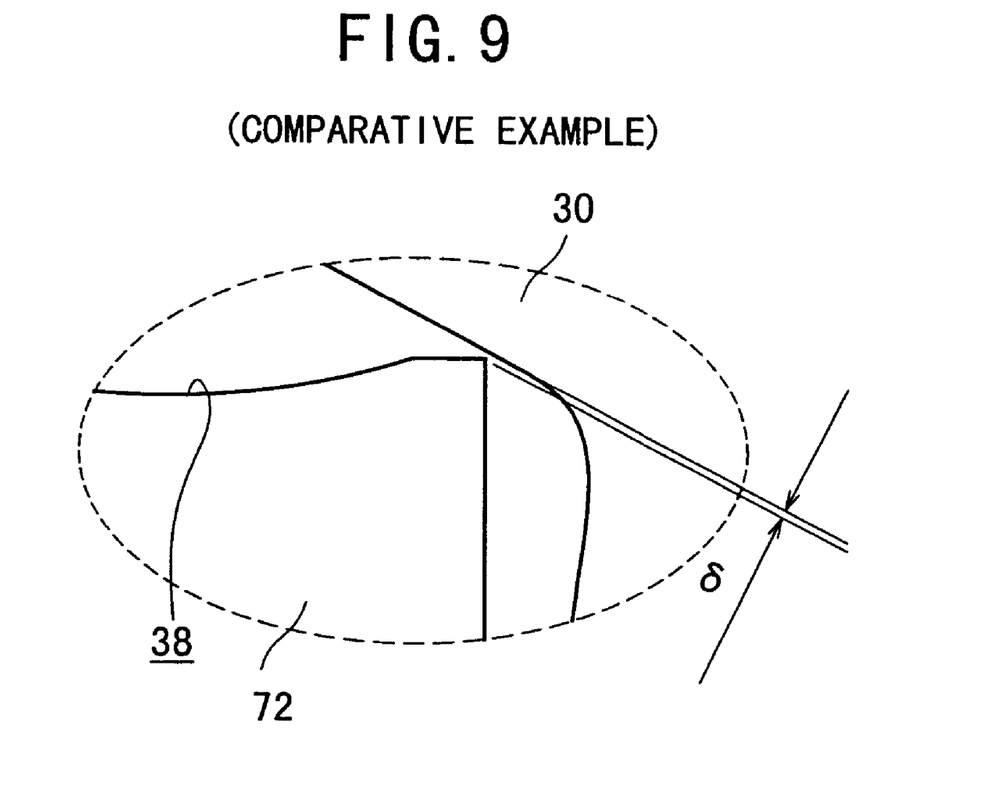
FIG. 9 is a magnified view showing a portion M in FIG. 7.
Figure 11:
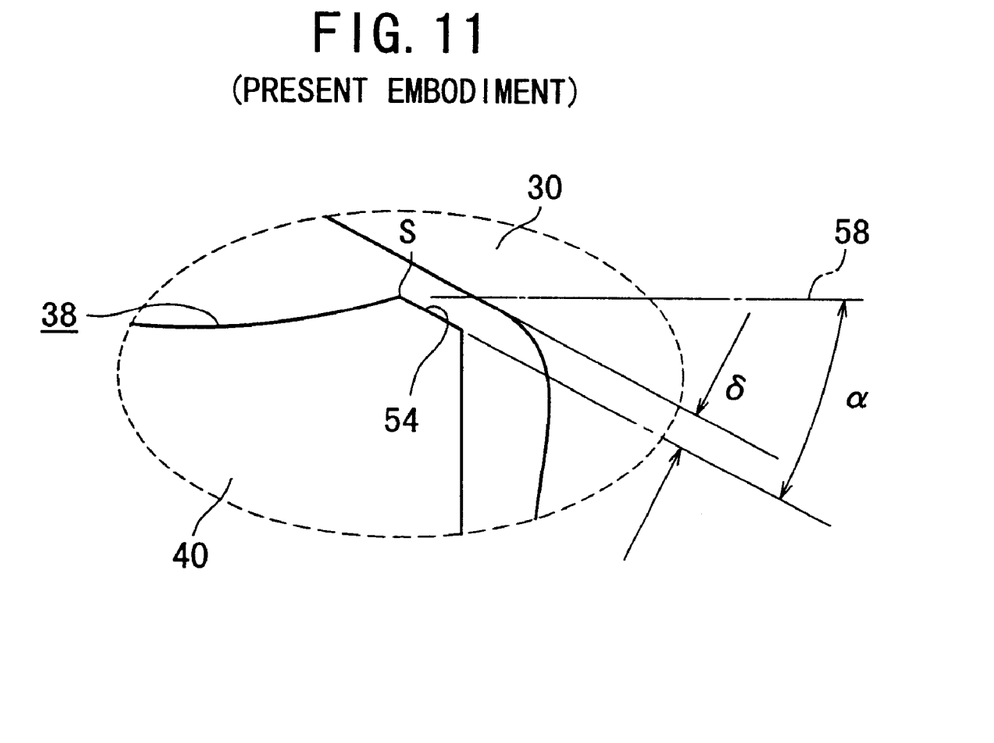
FIG. 11 is a magnified view showing a portion N in FIG. 10.

In comparison with the constant velocity universal joint 70 of the comparative example, the constant velocity universal joint 10 of the present embodiment is designed such that the clearance δ indicating the margin for preventing interference between the inclined surface of the chamfered portion 54 of the inner roller 40 and the neck 30 of the trunnion 28a (28b, 28c) is large (see FIGS. 9 and 11). Since the clearance δ is large, it is possible to increase the diameter of the neck 30 of the trunnion the 28a (28b, 28c) of the constant velocity universal joint 10 according to the present embodiment in comparison with the constant velocity universal joint 70 of the comparative example. Therefore, it is possible to increase the strength of the neck 30 of the trunnion 28a (28b, 28c).

As described above, in the constant velocity universal joint 10 according to the present embodiment, as shown in FIG. 11, the chamfered portion (inclined surface) 54 extending from a starting point S is provided. The starting point S is defined by the crossing point of the recess 38 and the extension line 58 from the short radius r of the elliptic cutout 52 formed on the inner roller 40. The inclined surface is inclined at an angle not less than the assembling angle θ. Therefore, the clearance δ indicating the margin for preventing interference between the inclined surface of the chamfered portion 54 of the inner roller 40 and the neck 30 of the trunnion 28a (28b, 28c) is large.

Accordingly, it is possible to increase the diameter of the trunnion 28a (28b, 28c) corresponding to the clearance δ.

In the constant velocity universal joint 10 of the present embodiment, the plurality of trunnions 28a to 28c and the spider boss 26 are formed integrally into one piece by forging. Since the diameter of the necks 30 of the trunnions 28a to 28c becomes large and the proportion of the diameter of the necks 30 is increased relative to the proportion of the diameter of the spherical surface 36, forging performance is improved. As a result, it is possible to improve productivity in forging the trunnions 28a to 28c.

Figure 6:
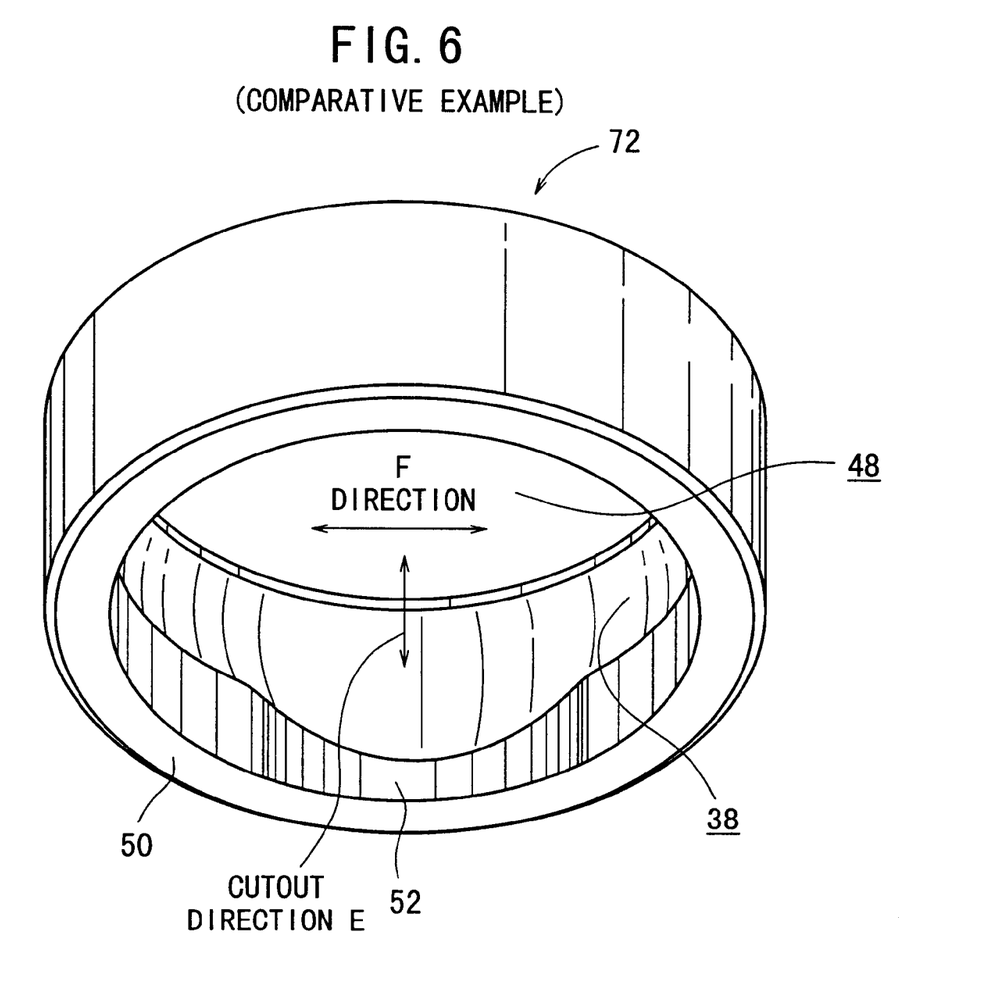
FIG. 6 is a perspective view of an inner roller of the constant velocity universal joint according to the comparative example.

In the constant velocity universal joint 70 of the comparative example, as shown in FIG. 6, an operating angle defined by the first shaft 12 and the second shaft 16 differs between the cutout direction E (major axis direction) indicating the direction of the elliptic cutout portion 52 and the direction F (minor axis direction) which is substantially perpendicular to the cutout direction E (the operating angle in the cutout direction E is larger than the operating angle in the direction of F). In contrast, according to the constant velocity universal joint 10 of the present embodiment, as shown in FIG. 4, since the chamfered portion 54 is formed circumferentially along the inner roller 40, the operating angle is not limited by the cutout direction of the elliptic cutout 52. Therefore, the operating angle can be kept substantially constant in any of diametrical directions.

Stated otherwise, in the constant velocity universal joint 10 of the present embodiment, the chamfered portion 54 of the inner roller 40 abuts against the neck 30 of the trunnion 28a (28b, 28c). Therefore, the operating angle defined by the first shaft as one transmission shaft and the second shaft as the other transmission shaft is limited equally in any of diametrical directions.

In a conventional constant velocity universal joint (not shown), before installing the universal joint to a vehicle, the operating angle defined by the first shaft and the second shaft is not limited at all. Therefore, when the operating angle is excessively large, the inner roller may be disengaged from the outer roller undesirably.

In contrast, in the constant velocity universal joint 10 of the present embodiment, the chamfered portion 54 of the inner roller 40 limits the operating angle equally in any directions. Therefore, before installing the constant velocity universal joint 10 to a vehicle, it is possible to limit disengaging degree of the inner roller 40 from the outer roller 44. Therefore, it is possible to prevent the inner roller 40 from being disengaged from the outer roller 44. Thus, it is possible to easily perform assembling operation of the constant velocity universal joint 10.

In the constant velocity universal joint 10 of the present invention, the inner roller 40 is rotatably provided with respect to the trunnion 28a (28b, 28c). Since the chamfered portion 54 has a conical cross section circumferentially, the disengaging degree of the inner roller 40 from the outer roller 44 is limited regardless of the condition of the inner roller 40. Accordingly, it is possible to minimize the size of the inner roller 40.

In general, it is possible to prevent the disengagement of the inner roller 40 by increasing height (axial dimension) of the inner roller 40. However, in the present embodiment, the chamfered portion 54 is provided in the inner roller 40 without increasing the height of the inner roller 40.

Next, a constant velocity universal joint 100 according to another embodiment of the present invention will be described below with reference to FIG. 12.

The constant velocity universal joint 100 according to the embodiment is different from the constant velocity universal joint 10 of the above described embodiment in that an intermediate member 81 for absorbing displacement in the axial direction of the trunnion 28a to 28c is provided between an inner roller 40 and a needle bearing 42 supported in a recess 46 of an outer roller 44.

The intermediate member 81 has a cylindrical portion 82 and a flange 84. The cylindrical portion 82 and the flange 84 are formed integrally into one piece. The flange 84 is bent downwardly from the cylindrical portion 82 and extends radially outwardly by a predetermined length. The inner roller 40 contact with an inner circumferential surface of the cylindrical portion 82. Each of a plurality of needle bearings 42 has a rolling surface for contacting with an outer circumferential surface of the cylindrical portion 82. Each end of the needle bearings 42 is supported by the flange 84.

Each of the needle bearings 42 is supported by a ring shaped washer 86. The intermediate member 81 is supported by a clip 88 which is in engagement with a washer 86 and fixed in an annular groove.

The constant velocity universal joint 10 comprises the inner roller 40 and the outer roller 44. The inner roller 40 is displaced vertically (in the direction indicated by an arrow C) together with spherical surfaces 36 of the trunnion 28a to 28c. The needle bearings 42 are disposed along the inner circumferential surface of the outer roller 44. The needle bearings 44 have functions of (1) transmitting a rotary force, (2) smoothly rotating the inner roller 40 and the outer roller 44, and (3) absorbing displacement in the vertical direction (the direction indicated by the arrow C).

Figure 12:
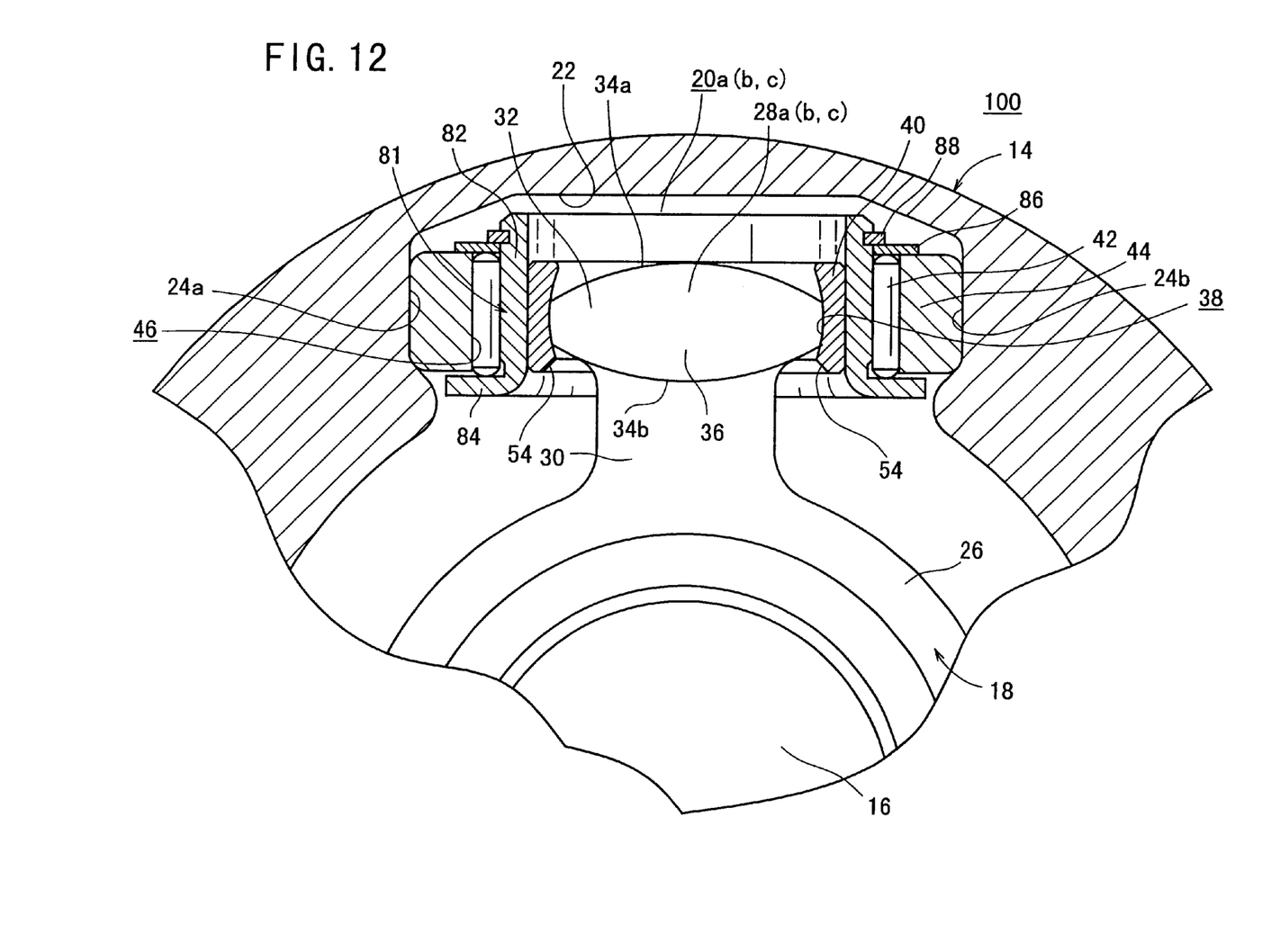
FIG. 12 is a vertical sectional view with partial omission showing a constant velocity universal joint, in a direction substantially perpendicular to an axis of the constant velocity universal joint, according to another embodiment of the present invention.

In the embodiment shown in FIG. 12, the intermediate member 81 is additionally provided between the inner roller 40 and the needle bearings 42. The intermediate member 81 has the function of (3) absorbing displacement in the vertical direction (the direction indicated by the arrow C). Therefore, the load of the needle bearings 42 is limited to the functions (1) and (2). Thus, it is possible to ensure reliable and smooth rotation of the inner roller 40.

While the invention has been particularly shown and described with reference to preferred embodiments, it will be understood that variations and modifications can be effected thereto by those skilled in the art without departing from the spirit and scope of the invention as defined by the appended claims.

What is claimed is:

1. A constant velocity universal joint comprising:

an outer member having guide grooves on an inner circumferential surface thereof;

a plurality of trunnions each having a continuous spherical surface without any planar surfaces in a circumferential direction around an axis thereof, said trunnions expanding toward said guide grooves; and inner rollers each having a spherical recess adapted to receive said spherical surface so that said inner rollers are externally fitted to said trunnions, said inner roller further comprising a chamfered portion formed by an inclined surface inclined at an angle not less than an assembling angle θ, said inclined surface extending from a starting point defined by a crossing point of said spherical recess of said inner roller and a short radius r of an elliptic cutout formed on said inner roller.

2. A constant velocity universal joint comprising:

an outer member having guide grooves on an inner circumferential surface thereof;

a plurality of trunnions each having a continuous spherical surface without any planar surfaces in a circumferential direction around an axis thereof, said trunnions expanding toward said guide grooves; and inner rollers each having a spherical recess adapted to receive said spherical surface so that said inner rollers are externally fitted to said trunnions, said inner roller further comprising a chamfered portion formed by an inclined surface inclined at an angle not less than an assembling angle θ, said inclined surface extending from a starting point defined by a crossing point of said spherical recess of said inner roller and a short radius r of an elliptic cutout formed on said inner roller, wherein shapes of said inner rollers and said trunnions are determined to satisfy the following expressions (1) to (4):

$$R-r>0 \tag{1}$$

$$\theta - \sin^{-1}\frac{H}{R} > 0 \tag{2}$$

$$R\cdot\sin\left(\sin^{-1}\frac{r}{R} - \theta\right) - d > 0 \tag{3}$$

wherein θ is the assembling angle, R is the radius of the spherical surface of the trunnion, H is the half spherical surface width of the trunnion, r is the short radius of the elliptic cutout formed on the inner roller, h is the half width of the inner roller, and d is the radius of a neck of the trunnion.

3. A constant velocity universal joint according to claim 2, wherein said chamfered portion and said neck of said trunnion abut against each other for limiting an operating angle defined by a first shaft as a transmission shaft and a second shaft as another transmission shaft.

4. A constant velocity universal joint according to claim 2, wherein an outer roller is externally fitted to said inner roller with a plurality of needle bearings interposed between said outer roller and said inner roller, and an intermediate member is disposed between said inner roller and said needle bearings.

5. A constant velocity universal joint according to claim 4, wherein said intermediate member comprises a cylindrical portion and a flange which is bent radially outwardly from an end of said cylindrical portion.

6. A constant velocity universal joint comprising:

an outer member having guide grooves on an inner circumferential surface thereof;

a plurality of trunnions each having a continuous spherical surface without any planar surfaces in a circumferential direction around an axis thereof, said trunnions expanding toward said guide grooves; and inner rollers each having a spherical recess adapted to receive said spherical surface so that said inner rollers are externally fitted to said trunnions, said inner roller further comprising a chamfered portion formed by an inclined surface inclined at an angle not less than an assembling angle θ, said inclined surface extending from a starting point defined by a crossing point of said spherical recess of said inner roller and a short radius r of an elliptic cutout formed on said inner roller, wherein shapes of said inner rollers and said trunnions are determined to satisfy the following expressions (1) to (4):

$$R-r>0 \tag{1}$$

$$\theta - \sin^{-1}\frac{H}{R} > 0 \tag{2}$$

$$R\cdot\sin\left(\sin^{-1}\frac{r}{R} - \theta\right) - d > 0 \tag{3}$$

$$r - H\sin\theta + \sqrt{R^2 - H^2}\cdot\cos\theta \leq 0 \tag{4}$$

wherein θ is the assembling angle, R is the radius of the spherical surface of the trunnion, H is the half spherical surface width of the trunnion, r is the short radius of the elliptic cutout formed on the inner roller, h is the half width of the inner roller, and d is the radius of a neck of the trunnion.

7. A constant velocity universal joint according to claim 6, wherein said chamfered portion and said neck of said trunnion abut against each other for limiting an operating angle defined by a first shaft as a transmission shaft and a second shaft as another transmission shaft.

8. A constant velocity universal joint according to claim 6, wherein an outer roller is externally fitted to said inner roller with a plurality of needle bearings interposed between said outer roller and said inner roller, and an intermediate member is disposed between said inner roller and said needle bearings.

9. A constant velocity universal joint according to claim 6, wherein said intermediate member comprises a cylindrical portion and a flange which is bent radially outwardly from an end of said cylindrical portion.

\* \* \* \* \*

UNITED STATES PATENT AND TRADEMARK OFFICE
CERTIFICATE OF CORRECTION

PATENT NO.   : 6,682,434 B2
DATED        : January 27, 2004
INVENTOR(S)  : Kawakatsu et al.

It is certified that error appears in the above-identified patent and that said Letters Patent is hereby corrected as shown below:

Column 9,
Line 55, the following equation is to be inserted as follows:

$$r - H\sin\theta + \sqrt{R^2 - H^2} \cdot \cos\theta > 0 \quad \cdots\cdots(4)$$

Signed and Sealed this

Twenty-eighth Day of June, 2005

JON W. DUDAS
*Director of the United States Patent and Trademark Office*